Oct. 10, 1950     W. J. TOLSON     2,525,737
PLATE SUPPORT
Filed April 14, 1948
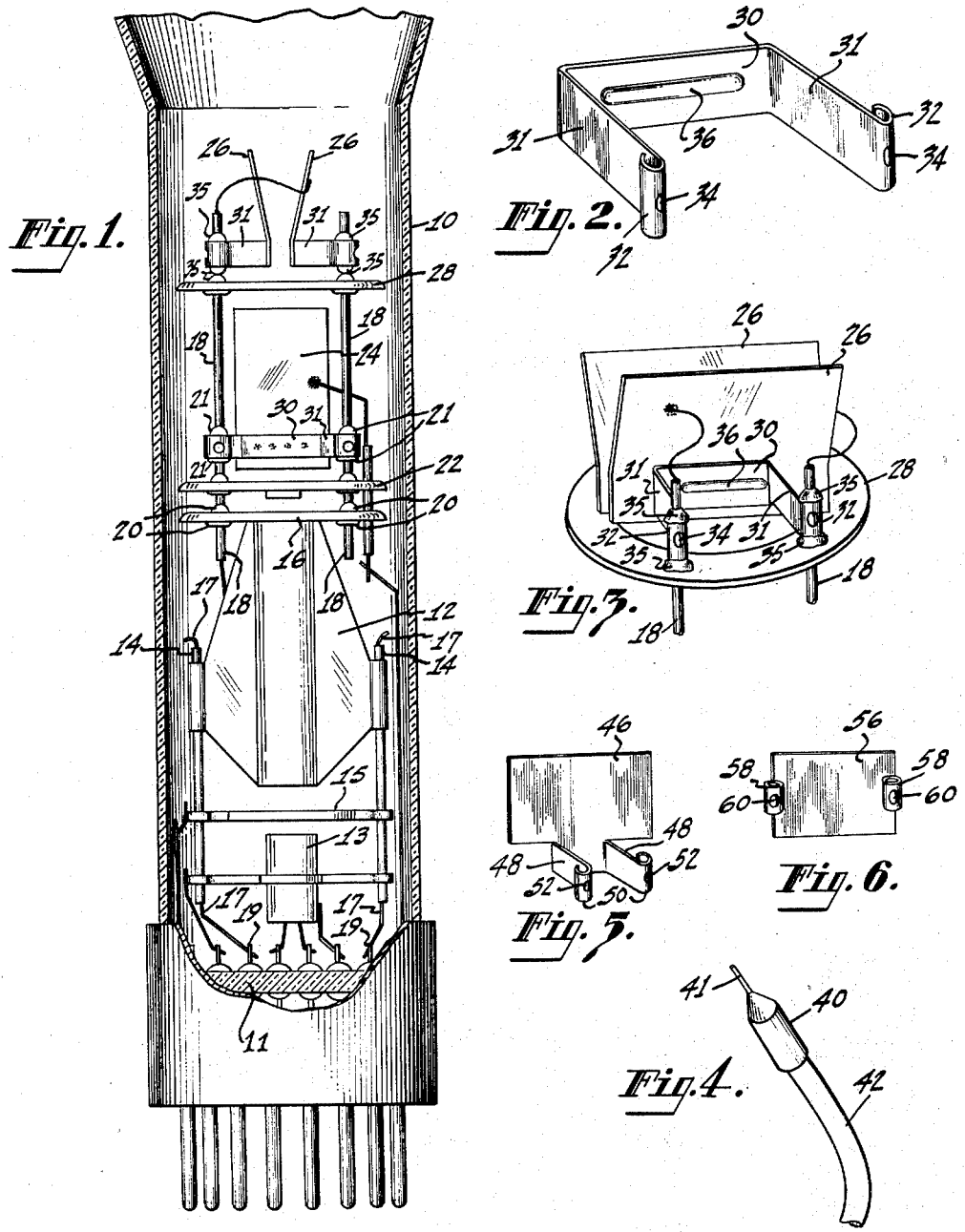
INVENTOR
WILSON J. TOLSON
BY
William A. Zalusak
ATTORNEY Patented Oct. 10, 1950

2,525,737

UNITED STATES PATENT OFFICE 2,525,737

PLATE SUPPORT

Wilson J. Tolson, Riverton, Utah, assignor to Radio Corporation of America, a corporation of Delaware Application April 14, 1948, Serial No. 20,869

8 Claims. (Cl. 250—27.5)

This invention relates to cathode ray tubes and more particularly the invention relates to a means for supporting a cathode ray deflection plate on ceramic support rods.

One type of conventional cathode ray tube utilizes an electron gun structure and two pairs of electrostatic deflecting plates. The several parts of the gun structure are usually mounted in fixed relationship on support rods. In addition, the two pairs of deflecting plates are fixedly supported, one pair above the other, by being cemented to ceramic rods supported from the gun structure.

The wide use of radar during the war has resulted in the installation of cathode ray equipment in land, water and air vehicles. Often cathode ray tubes, which are a part of such installations and which have gun structures, as briefly described above, all undergo excessive vibration during use. It is desirable to have such cathode ray tubes withstand a vibrational force 10 times that of gravity. Under such conditions, it is desirable to reduce the inertia of the electron gun structure and properly mount the deflection plates so that they will not become misaligned during extreme operating conditions. A particular problem, in the operation of cathode ray tubes of this type under excessive conditions, has been the failure of the cement binding the deflection plates to their ceramic support rods.

It is, therefore, an object of my invention to provide an improved cathode ray tube for use under extreme conditions.

It is a further object of my invention to provide for a cathode ray tube an improved electron-gun-deflecting plate structure having less inertia for use under excessive conditions.

It is also an object of my invention to provide for a cathode ray tube an improved support means for a deflection plate.

It is a further object of my invention to provide an improved support means mounting and deflection plate of a cathode ray tube on a ceramic support rod.

The novel features which I believe to be characteristic of my invention are set forth with particularity in the appended claims, but the invention itself will best be understood by reference to the following description taken in connection with the accompanying drawing, in which:

Figure 1 is a partial sectional view of a cathode ray tube incorporating the structure of my invention;

Figure 2 is a cathode ray deflection plate support according to my invention;

Figure 3 is a detailed view of the deflection plates and their supporting structure of the cathode ray tube of Figure 1;

Figure 4 is a cement applicator; and

Figures 5 and 6 are modifications of the deflection plate support means for a cathode ray tube.

Figure 1 discloses a cathode ray tube having a glass envelope 10 closed at one end by a glass stem 11. Mounted upon this glass stem structure is an electron gun structure including a cathode-grid assembly 13 fixed to two ceramic support rods 14. The support rods are of a hollow type having stiff wires 17 passing through the rods. The wires 17 are of sufficiently heavy material so as to rigidly support the ceramics 14 in their upright position. At the lower end, the wires are welded to heavy wire leads 19 passing through the glass stem 11. Also, mounted on the ceramic supports 14 and spaced a predetermined distance above the cathode-grid assembly 13, is an apertured disc forming a focusing electrode or grid 15. Spaced above the focusing grid 15 and also mounted on the ceramic rods 14 is an accelerating electrode 12 having a circular plate structure 16 fixed to its upper end. Mounted on the plate 16 are a plurality of ceramic support rods 18 equally spaced around the edge of the circular plate 16. These support rods 18 pass through apertures in plate 16 and are held rigidly thereto by a small quantity of cement 20 applied above and below plate 16 to firmly fix the ceramic rods 18 to plate 16. Spaced above the electrode plate 16 is a second anode plate 22 mounted on the ceramic support rods 18. The anode plate 22 is also firmly fixed to the ceramic rods 18 by being cemented above and below the plate in a manner as shown in Figure 1. Near the upper ends of the ceramic rods 18 is similarly fixed, by cementing, a metal spacer and support ring 28. Between the anode plate 22 and the spacer plate 28 are mounted a pair of deflection plates 24 cemented at 21 to the ceramic rods 18. Also above the spacer plate 28 at the ends of the support rods 18 are mounted a second pair of deflection plates 26 cemented at 35 to the ceramic rods 18.

The operation of the cathode ray tube of Figure 1 is conventional. The electron beam forming gun structure, which comprises the grid-cathode assembly 13 and the electrodes 15, 12 and 22, produces a beam of electrons, which is properly focused and accelerated so as to be directed along the axis of the tube envelope 10 and between the two pairs of deflecting plates 24 and 26 respectively.

As is evident from Figure 1, the gun structure of the tube as well as the two pairs of deflecting plates mounted on the gun structure are mainly supported by the heavy wires 17. In present day installations of cathode ray tubes, similar to that of Figure 1, the physical conditions under which the tubes operate are such that the tubes are subjected to constant vibration which at times becomes quite severe. The comparatively large inertia of the electron gun structure supported by wires 17, will produce somewhat of a whipping action when the cathode ray tube is subjected to abnormal jars and vibrations either during use or during vibration tests to which the tube is subjected during tube processing. Under such circumstances, it has been found that the structure mounting the deflection plate electrodes to the ceramic support rods 18 has failed and has resulted in the breaking away of the cement holding the deflection plates to the ceramic rods or often in the deflection plates themselves becoming distorted.

In Figure 2 there is shown an improved deflection plate support structure which comprises principally of a longitudinal body portion 30. Opposite ends of the body portion 30 are bent outwardly from its surface to respectively form two arms 31. The free end of each arm is bent around to form a cylindrical portion 32. Through the wall of each of the tubular portions 32 is an aperture 34, the purpose of which will appear below.

As is shown in Figures 1 and 3 my improved support structure 30 is fixed, by welding or any other desired manner, to the outer surface of the deflection plates 24 or 26. The length of the body portion 30 of the support is approximately the same as the distance between the two support rods 18, to which the deflection plate (Figure 3) is fixed. The deflection plate 26 (Figure 3) may be mounted on its respective ceramic support rods 18 by slipping the two tubular portions 32, one over each support rod 18. While the deflection plate is being held in its desired position by any preferred jig structure, soft cement is applied as at 35 to the support structure 30 to fix it firmly to the two support rods 18.

The cement comprising principally of water, glass and alumina is preferably applied by an applicator 40 having a nozzle 41, as shown in Figure 4. The applicator 40 is fastened to a flexible hose 42 leading to a container (not shown) of soft cement. The cement in the container is kept under pressure which forces the cement out of nozzle 41 under the control of a manually operated valve in the hose connection 42. To cement the support 30 with its respective deflection plate to the ceramic supports 18, an operator inserts the end 41 of nozzle 40 into an aperture 34. Opening the control valve in the hose line 42 will permit the soft cement to be forced through the nozzle tip 41 into the space within the tubular portion 32. The application of the cement is continued until all of the space is filled between the tubular portion 32 and the respective support rod 18 and some cement oozes out of the open ends of tubular portions 32 to form an overlapping dab 35. The cement hardens within the enclosing tubular portions 32 to firmly lock the support structure 30 to the ceramic rod 18. Furthermore, the overlapping dabs 35 of the cement aid in preventing axial movement of supports 30 relative to the tubular rods 18.

The application of the cement to the ceramic rods 18 is simplified in that the application of cement is made at only one point to fasten support 30 to the support rod 18. A conventional plate support structure requires at least two, if not more, applications of cement at each point of support on each support rod and involves placing a dab on the support rod above and below the support structure of the deflection plate. Often, the dab is not placed completely around the ceramic rod 18 or insufficient cement is used. With my improved support structure 30, the cement is applied in a single application through aperture 34 and tubular portions 32 are filled until the cement is forced out the opened ends. Thus, the cement is automatically forced along a greater length of the supporting rods 18 and also tends to flow completely around the rod 18 within the tubular portion 32. By this means, there is always a sufficient surface of the rod 18 and the support structure 30 bonded together by the cement.

Another fault of the conventional method of cementing the deflecting plates to the ceramic rods was the breaking off of the cement dabs from the ceramic rods due to abnormal vibrations or physical conditions to which the tube structure would be subjected. With my improved structure, however, the cement is firmly locked between the plate support structure 30 and the support rod 18, with the result that the cement bond holding the deflection plates to the support rod 18 will withstand greater strains.

With the improved deflection plate support structure 30, it is possible to reduce the weight of the deflection plates 24 and 26 by the use of thinner material. This is possible due to the fact that the body portion 30 of my support structure forms a reinforcing structure for the deflection plate 24 or 26. If desired, an embossing or a rib structure 36 may be pressed into the body portion 30 to give the deflection plate 24, 26 a greater rigidity. In a sample tube, which I have constructed, actual tests have shown that a plate of 0.0125" material may be used instead of the regular 0.020" material with entire satisfaction. This change in the weight of the deflection plates has produced a weight reduction of around 37%.

The deflection plates 24 may also be made narrower. Ordinarily, plates 24 have to be made at least as wide as the distance between the support rods 18. This greater width is not required for the operation of the cathode ray tube but merely because the conventional support structure mounting the plate 24 to the rods 18 was spaced the distance between support rods. With my improved mounting structure, however, the plate is supported across its center, and as is shown in Figure 1, the arms 31 may be bent at an angle to the plate surface so that they may project outwardly and intercept the support rods 18.

In the sample tube mentioned above which I have constructed, by actual tests I have shown that these deflection plates 24 may be reduced from a 1" width which is standard in present mounts to a ½" width. These tests show that this reduction in the width of the deflection plates 24 may be made without affecting the electrical characteristics of the tube. In this case there is another weight reduction of 50%, or it has been estimated that the total weight reduction on the four deflection plates per tube is around 53½% which provides a saving of over one-half of the material used.

Another advantage resulting from the weight reduction described above is that the center of gravity of the composite electron gun and deflection electrode assembly is considerably lowered. Thus, the inertia of the mount is reduced so that strain placed upon the two main support wires 17 is greatly lessened. A tube utilizing these improvements is able to withstand greater physical shocks under extreme conditions without misalignment of the mount structure relative to the axis of the tube stem 18.

To anyone skilled in the art, many modifications entirely within the spirit of my invention will present themselves. The particular shape of the body portion 30 may be varied in many ways. Furthermore, the angle at which the arms 31 extend from the body portion 30 is a matter of choice and will conform with the particular use to which this novel mount structure is put. Also, it is not always necessary that the mount have two arm portions 31. For some conditions, the deflection plates 24, 26 may be sufficiently supported by using only one arm extending from an end of the body portion 30 or even from the center of the body portion 30. It is also conceivable that the support structure of Figure 2 may be built up from separate elements in which such parts as 30, 31 and 32 may be separately formed and joined together.

If the reduction of weight and material of the deflection plates 24, 26 is not a major consideration, the particular plate structure described above may be so modified that it is an integral part of the deflection plate. For example, Figures 5 and 6 show possible modifications. Figure 5 discloses a deflection plate 46 in which the lower portion is cut in from opposite edges to form two arm portions 48. These arm portions 48 may be bent outwardly at any desired angle. Also, the free ends of the arms 48 may be formed into tubular portions 50 for enclosing ceramic support rods. Each of the tubular portions 50 respectively have an aperture 52 through the wall thereof corresponding to apertures 34 of plate support structure 30.

Another modification is shown in Figure 6 in which the projecting arm portions of the support are eliminated for a possible condition in which a deflection plate 56 may be fastened directly to ceramic support rods. In this modification, tubular structures 58 are fastened on opposite edges of the deflection plates 56. These tubular portions correspond to portions 32 of the preferred modification of Figure 2 and also have apertures 60 through the walls thereof for the application of the cement. These tubular portions 60 need not necessarily be confined to the edges of plate 56 and which have been bent to form the tubular elements.

The support structures 30 disclosed in Figures 2, 5 and 6, for example, need not necessarily be confined in their application to a deflection plate electrode. It is conceivable that such a support structure may be used in mounting other types of electrode structures, or for mounting any other element within an electron discharge tube in which the particular structure to be mounted is fixed by a cement to a supporting rod.

While certain specific embodiments have been illustrated and described, it will be understood that various changes and modifications may be made therein without departing from the spirit and scope of the invention.

What I claim as new is:

1. A support element for mounting an electrode to a support rod comprising a first portion adapted to be mounted on the electrode, and a second portion integral with said first portion and adapted to enclose a portion of said support rod, said second portion constructed to loosely fit said support rod and having an opening for filling said second portion with cement.

2. A support element for mounting a cathode ray tube deflection plate to a ceramic support rod comprising a first portion adapted to be fixed to the deflection plate, and a second tubular portion fixed to said first portion and constructed so as to loosely enclose said ceramic supporting rod, said tubular portion having an aperture through the wall thereof for filling said tubular portion with cement.

3. A support element for mounting an electrode of a discharge device to two support rods, said element comprising a flat body portion adapted to be fixed to the electrode of the discharge device, two arm portions extending from said body portion and a tubular portion formed by the outer end of each one of said arm portions to loosely enclose part of a support rod of the discharge device, each of said tubular portions having an aperture in the wall thereof for filling the space between said tubular portion and the support rod with cement.

4. A support for mounting a deflection plate of a cathode ray tube, said support comprising two ceramic support rods, a flat rectilinear plate adapted to be fixed to the surface of the deflection plate, two arm portions extending from opposite sides of said rectilinear plate and a tubular portion formed by the outer end of each one of said arm portions, each of said tubular portions loosely enclosing one of said support rods, each of said tubular portions having an aperture in the wall thereof for filling the space between said tubular portion and the support rod with cement, cement filling the space between each of said one support rods, said rectilinear plate having an embossed rib for increasing the rigidity of said plate.

5. An electrode for an electron discharge device, said electrode comprising a body portion and means for mounting said electrode on a support rod, said means including a tubular portion joined to said body portion for loosely enclosing the support rod, said tubular portion having an aperture in the wall thereof for filling the space between the support rod and said tubular portion with cement.

6. In combination, an electrode for an electron discharge device and a support rod, said electrode comprising a body portion and means mounting said electrode on said support rod, said means including an arm extending from said body portion, a tubular element formed by the free end of said arm and loosely enclosing a portion of said support rod, cement filling the space between said tubular element and said support rod, said tubular element having an aperture through the wall thereof for filling the tubular element with cement.

7. In combination, two support rods and deflection electrode for a cathode ray tube, said electrode including a plate structure and means mounting said electrode plate on said two support rods, said mounting means comprising a flat body portion fixed with one face thereof in contact with a surface of said plate electrode, two arms extending from said body portion and a tubular element formed by the outer end of each one of said arms and loosely enclosing a portion of one of said ceramic rods, cement in the space between said support rods and each of said tubular elements respectively, each of said tubular elements having an aperture in the wall thereof for inserting said cement between said tubular element and the respective ceramic rod.

8. A cathode ray tube comprising an envelope, a pair of ceramic support rods mounted within said envelope, an electron beam deflection plate electrode spaced within said envelope from said ceramic rods, means mounting said deflection plate to said ceramic rods including a longitudinal plate structure fixed to a surface of said deflection plate and two arms integral with said plate structure and extending outwardly from opposite edges thereof, the outer ends of said arms each forming a tubular portion loosely enclosing part of said ceramic support rods, means within said tubular portion rigidly cementing said tubular portion to said ceramic rods, each of said tubular portions having an aperture for introducing said cementing means into said tubular portion.

WILSON J. TOLSON.

REFERENCES CITED

The following references are of record in the file of this patent:

UNITED STATES PATENTS

| Number | Name | Date |
|---|---|---|
| 2,055,655 | Davisson | Sept. 29, 1936 |
| 2,060,825 | Ressler et al. | Nov. 17, 1936 |
| 2,348,216 | Holshouser | May 9, 1944 |
| 2,465,732 | Lems | Mar. 29, 1949 |